United States Patent [19]

Wohlgemuth et al.

[11] Patent Number: 5,795,598
[45] Date of Patent: Aug. 18, 1998

[54] ASSEMBLY FOR INFLATING A PARISON AND FORMING THE NECK OF A PLASTIC BOTTLE

[75] Inventors: Emanuel E. Wohlgemuth, North Bellmore, N.Y.; Richard J. Cobiski, Jr., St. Charlton, Mass.

[73] Assignee: Ultraseal Technologies Corporation, Worcester, Mass.

[21] Appl. No.: 842,091

[22] Filed: Apr. 28, 1997

[51] Int. Cl.[6] .................................................. B29C 49/58
[52] U.S. Cl. ........................ 425/525; 425/527; 425/535
[58] Field of Search ........................... 425/525, 527, 425/531, 535

[56] References Cited

U.S. PATENT DOCUMENTS

| | | | |
|---|---|---|---|
| 3,733,384 | 5/1973 | Gerlovich et al. | 425/535 |
| 3,737,273 | 6/1973 | Conner | 425/535 |
| 3,782,877 | 1/1974 | Mehnert | 425/531 |
| 4,187,070 | 2/1980 | Martin, Jr. | 425/525 |
| 4,234,299 | 11/1980 | Kuenzig et al. | 425/525 |
| 4,390,338 | 6/1983 | Bowers et al. | 425/525 |
| 4,631,020 | 12/1986 | Frankenberg et al. | 425/527 |
| 4,929,410 | 5/1990 | Meyer et al. | 425/535 |
| 5,256,055 | 10/1993 | Morris | 425/527 |
| 5,589,204 | 12/1996 | Wohlgemuth | 425/525 |

*Primary Examiner*—Robert Davis
*Attorney, Agent, or Firm*—Hoffmann & Baron, LLP

[57] ABSTRACT

An assembly for inflating a parison and forming the neck portion of a plastic container in a blow molding machine is provided. The assembly includes a blow rod, a blow pin mounted to the blow rod, and a heat sink for removing heat from the blow pin. The heat sink includes flow channels for facilitating the dissipation of heat. It is located in proximity to the shearing edge of the blow pin to enable the removal of heat therefrom. As the shearing edge of the blow pin is maintained at a relatively low temperature, the blow molding machine can be operated at faster cycle times without reducing the sealing capability of the container neck portion.

20 Claims, 5 Drawing Sheets

ASSEMBLY FOR INFLATING A PARISON AND FORMING THE NECK OF A PLASTIC BOTTLE

BACKGROUND OF THE INVENTION

1. Field of the Invention

The field of the invention relates to assemblies, such as blow pin assemblies, which are used in blow molding machinery for inflating parisons and forming the necks of containers manufactured by such machinery.

2. Brief Discussion of the Prior Art

The blow molding of plastic containers is well known and practiced worldwide. Blow molding offers many advantages over other forms of container manufacturing.

These advantages include the ability to produce containers at minimal cost and with minimal waste; the low start-up costs and mold making lead times in comparison to other manufacturing methods, such as injection molding; the ability to produce irregular shaped and hollow containers; the ability to produce containers quickly and automatically; the ability to produce containers from a variety of materials having qualities suited to the specific application.

Blow molds for producing such containers are commonly made of aluminum. Aluminum offers several advantages. Among those are: ease and economy of mold manufacture; light weight; efficient heat transfer. Because the process pressures and clamping forces during blow molding are relatively low, and mold erosion from the flow of molten plastic is not a factor, aluminum is amply strong and wear resistant for blow molding, whereas other processes, such as injection molding, require the use of hardened steel.

Blow molded containers having specially formed neck finishes are commonly employed for use with container closures. Neck finishes may be threaded for use with threaded closures, adapted for mating with snap-on closures, etc. It is common within a container blow mold system to employ a main mold to form the container reservoir, and a neck block, or top block, to form the neck finish. Top blocks are also made to standard dimensions so that the parting face of the top block and main mold properly match. The main mold is usually adapted to interchangeably accept any standard top block for a particular container size or style. Top blocks and main molds are generally aligned visually by being loosely engaged, tapped into alignment such as with a mallet, then firmly affixed together. The back side of each mold half, and the back side, or heel, of each top block, are affixed to a planar mounting or back plate.

The first pair of components mounted to the top block are the neck finish blocks. Each neck finish block is usually made of aluminum, and may originally be formed as a circular body. The circular body is cut in half to form the neck finish block for each half of the mold. The neck finish blocks are machined to provide threads, ratchet teeth, shoulders or other surface features on the container which are used to engage or otherwise accommodate a closure.

During blow molding, a parison of molten plastic is extruded between the open mold halves, then the mold system closes to entrap the parison within the mold cavity. A hollow blow pin, which is made of tool steel, is inserted through the neck opening, and into the parison where it inflates the parison with pressurized air to cause the parison to form to the shape of the container and neck finish cavity. The blow pin includes a hardened steel bushing, or shear bushing, having an annular blade, and each top block half includes a semi-circular hardened steel blade, or shear steel.

The shear steel shapes and trims flash from the top end of the bottle neck. By providing various degrees of precision ground undercut to the bottom surfaces of the shear steels, a distinct radius can be formed at the upper edge of the bottle neck area. This can improve the strength of the bottle neck in this critical area. Shear steels are made of precision ground and hardened steel.

When the mold is closed, the semi-circular blades and seals form annular orifices around the shear bushing. During molding, portions of the parison extending beyond the mold cavity are trapped between the parting faces of the mold halves and become unwanted flash. After the container is formed within the cavity and before the mold system reopens to release the blow molded container, the shear bushing is retracted through the shear steel orifice. The shear bushing and shear steels are sized and shaped so that the retraction causes a shearing of the container opening through the neck, whose diameter is that of the shear bushing blade and shear steel orifice. After the molded container is removed from the mold, flash is removed by trimming in an automated process.

The last set of components which are mounted to the top block are the master seals, which are sometimes referred to as masters. These components provide a seal for the blow pin, thereby preventing air from escaping from the mold when the parison is inflated to form the container. They also form a "flash pocket" which pinches and seals the parison when the molds close at the start of the production cycle. When all neck finish components, i.e. the neck finish block, the shear steel and the master seal, have been mounted to the top block halves, they are then secured thereto with four Allen cap screws. Failure to do so can prevent the mold from closing properly, leading to damage or even destruction of the neck finish components and/or blow pin. U.S. Pat. No. 5,589,204, the disclosure of which is incorporated by reference herein, discloses a mold assembly including a top block assembly which facilitates alignment of the neck finish components with the mold parting line.

It has long been a goal of those in the molding industry to effectively remove heat from the various components of molding machinery. The desirability of cooling the blow pin in particular has been recognized, and various approaches have been taken for achieving such cooling. U.S. Pat. Nos. 3,717,429, 4,234,299 and 4,187,070 disclose various blow pin assemblies having air passages or other means for cooling them with the air or gas used to inflate the parison within the mold.

Attempts to cool blow pins in the above-described manner have not been particularly successful. In order to effect proper shearing of the neck portion of the container, sufficient time must be allowed for cooling before the blow pin can be withdrawn and shearing occurs. Premature blow pin withdrawal will result in "fuzz" within the container neck portion. Poor sealing of a subsequently applied cap may result in leakage of the container.

SUMMARY OF THE INVENTION

It is an object of the invention to provide a blow pin assembly which effectively shears the plastic in the neck portion of a container formed in a blow molding machine.

It is another object of the invention to accomplish such shearing while reducing the time in which the blow pin is maintained in the neck portion of a container, thereby increasing the speed of the molding machine.

A still further object of the invention is to eliminate "fuzz" in the neck portion of a blow molded container, thereby allowing an effective seal to be formed between the neck portion and a subsequently applied cap.

In accordance with the above objects of the invention, a blow pin and an assembly including a blow pin are provided for inflating a parison and forming the neck portion of a plastic container in a blow molding apparatus. The assembly includes a blow pin assembly which is mountable to a blow rod. The blow pin assembly includes a blow pin body including an annular shearing member. The blow pin body is preferably made of a durable material such as tool steel. A heat sink is provided for removing heat from the blow pin body, and is preferably positioned within an internal cavity of the blow pin body. The heat sink is comprised of a second material, such as aluminum, which possesses high heat transfer properties. The heat sink is exposable to air or gas which exits the blow rod for inflation of the parison. It preferably includes a plurality of flow passages therein to facilitate heat dissipation.

The mass of the blow pin body near one end thereof is reduced substantially in accordance with a preferred embodiment of the invention. Tool steel, the material from which blow pin bodies are commonly made, is durable and can provide an effective cutting edge. It is, however, a relatively poor conductor of heat. By reducing the mass thereof and replacing it with an effective heat sink, durability is not sacrificed while heat transfer is greatly enhanced. This allows the cycle time of the molding machine to be reduced significantly, as less time is required for the blow pin to cool sufficiently. The shearing member is also more effective at lower temperatures, providing a cleaner cut.

DETAILED DESCRIPTION OF THE INVENTION

A blow pin assembly 10 is provided for use in blow molding machinery. Such machinery is in widespread use today for manufacturing plastic containers filled with milk, juice or water. U.S. Pat. No. 4,234,299, which is incorporated herein by reference, contains a discussion of blow molding machinery of this type.

Figure 2:
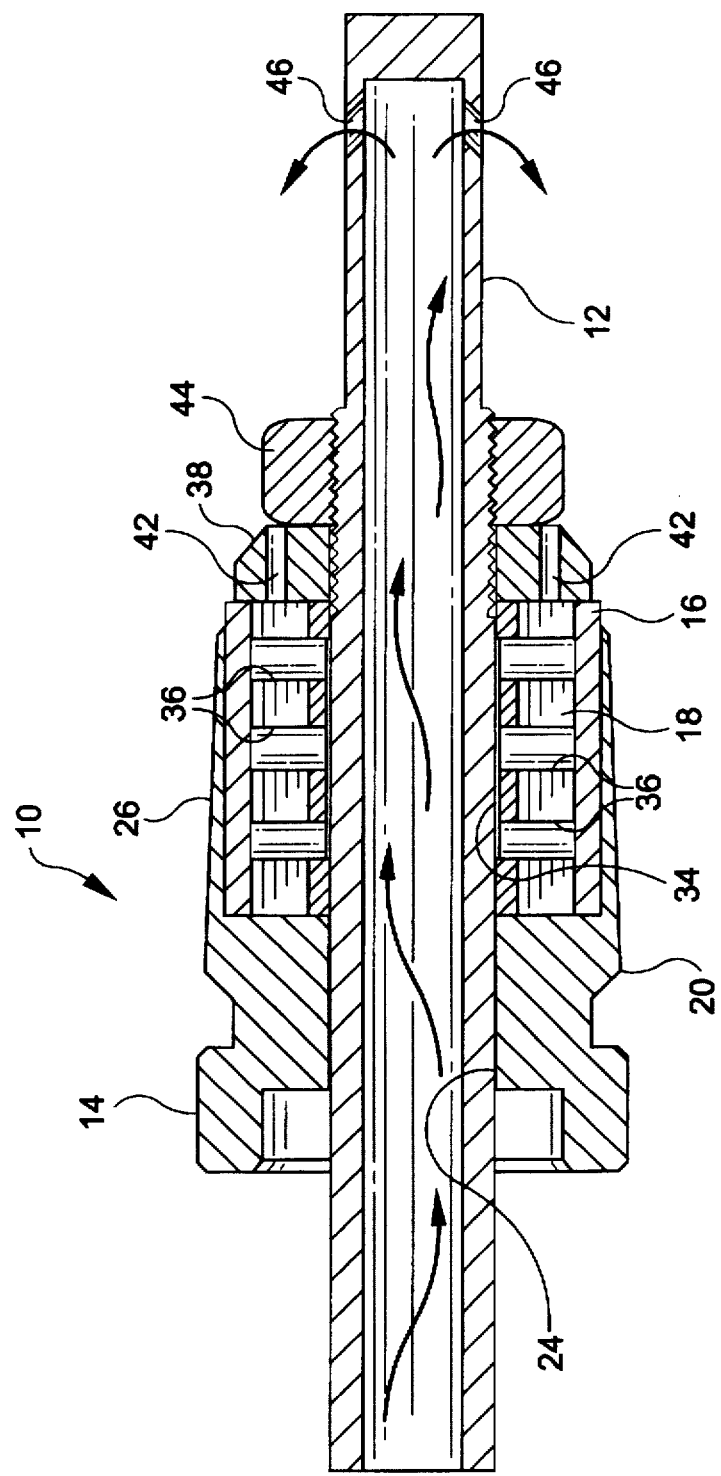
FIG. 2 is a sectional view of an assembly for inflating a parison, including a blow pin assembly and a blow rod.

The blow pin assembly 10 according to the preferred embodiment of the invention is adapted for mounting to a blow rod 12, as shown in FIG. 2. This assembly and the blow rod together form an assembly for inflating a parison. The blow pin assembly also plays a part in the formation of the neck of a plastic container.

Figure 1:
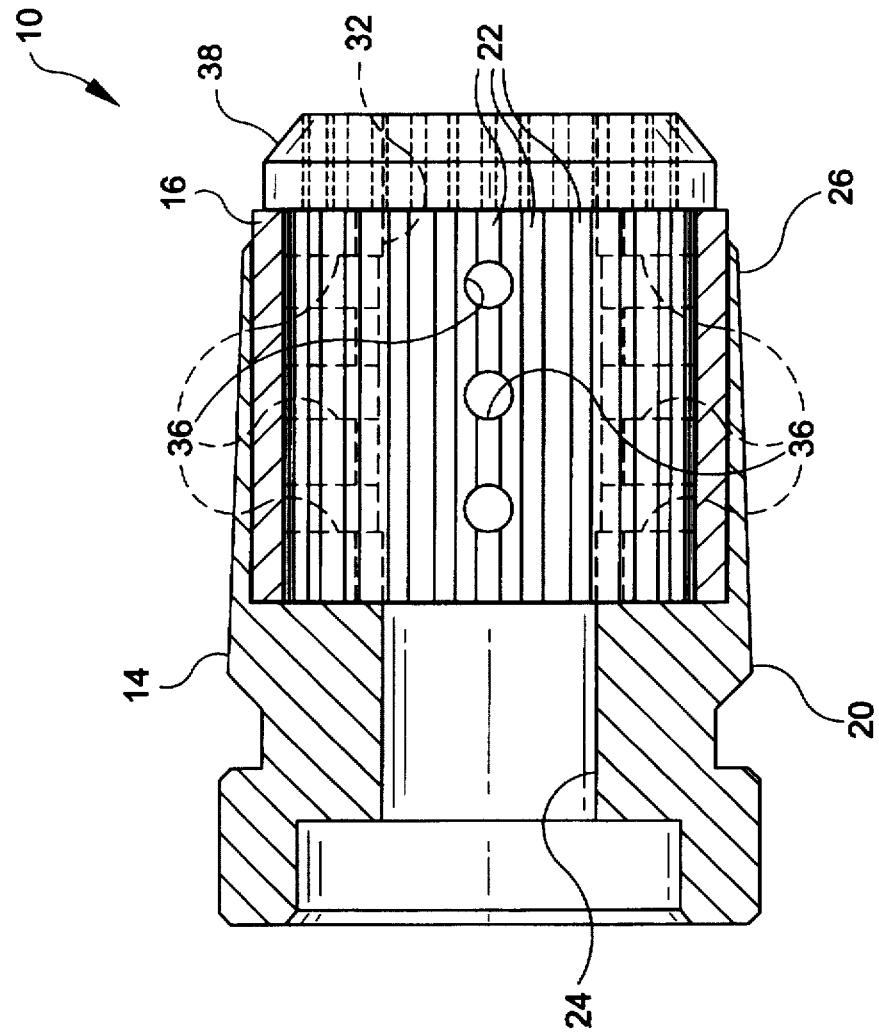
FIG. 1 is a partially sectional, elevation view of a blow pin assembly according to the invention.
Figure 3:
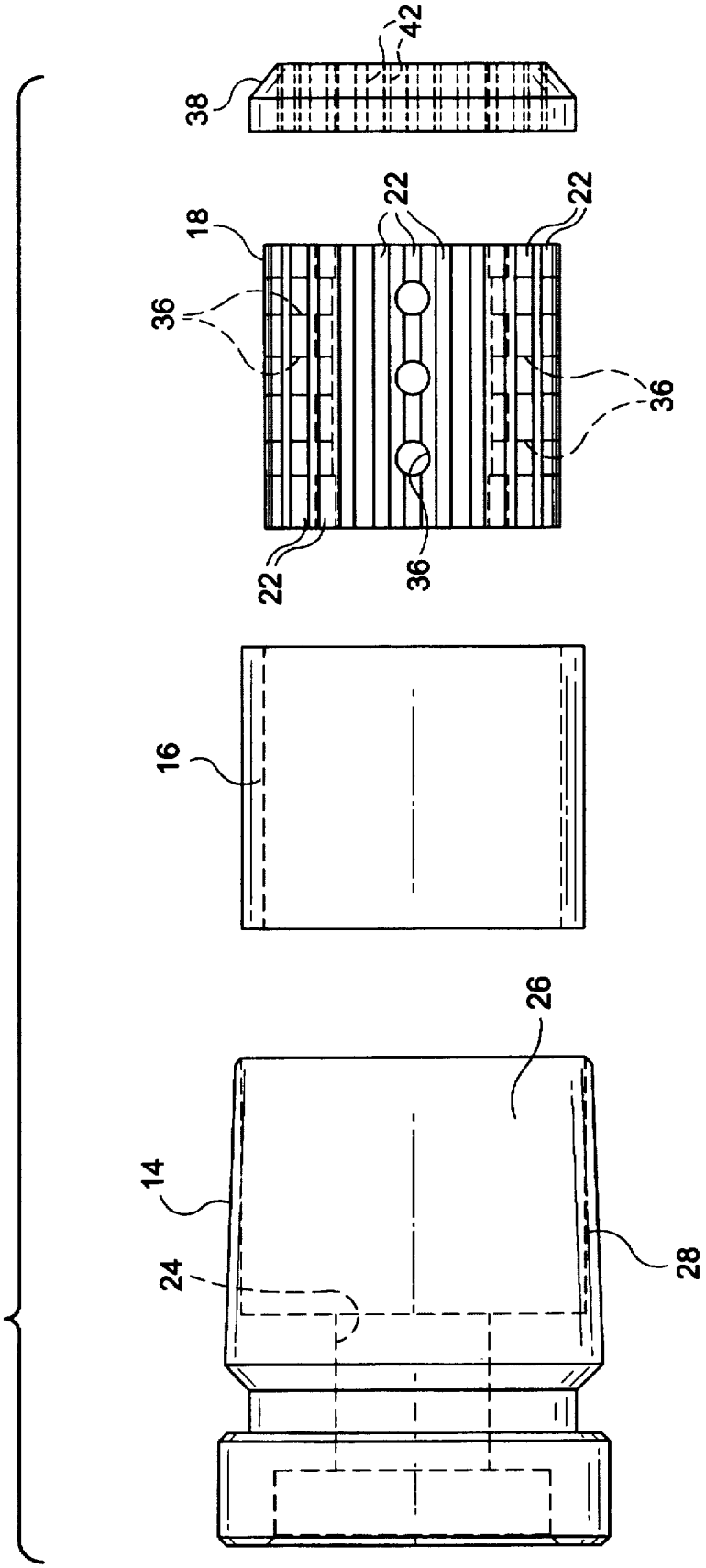
FIG. 3 is an exploded, elevation view of the blow pin assembly.

As shown in FIGS. 1–3, the blow pin assembly 10 is comprised of a blow pin body 14 and a heat sink 16, 18. The exterior surface of the blow pin body resembles those of known blow pins, such as disclosed in U.S. Pat. No. 4,234,299. The blow pin body is made from a durable material, such as tool steel. A shearing member in the form of an annular cutting edge 20 is defined by the exterior surface of the blow pin body. While the shearing member is preferably integral with the blow pin body, it may be formed as a separable member. In either event, it is a primary object of the invention to transfer heat from the shearing member, whether this member is integral with a blow pin body or not.

Figure 4B:
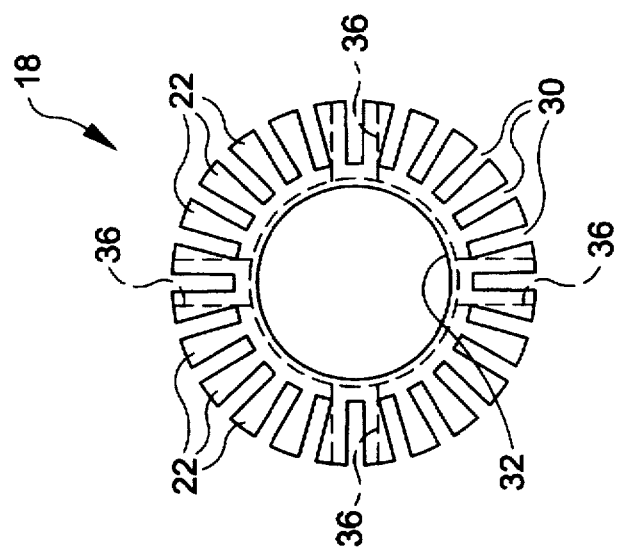
FIG. 4B is an end view thereof.
Figure 4A:
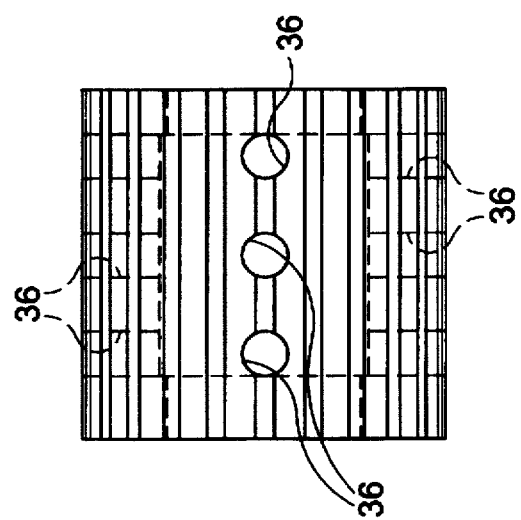
FIG. 4A is a side elevation view of an inner heat sink.
Figure 5:
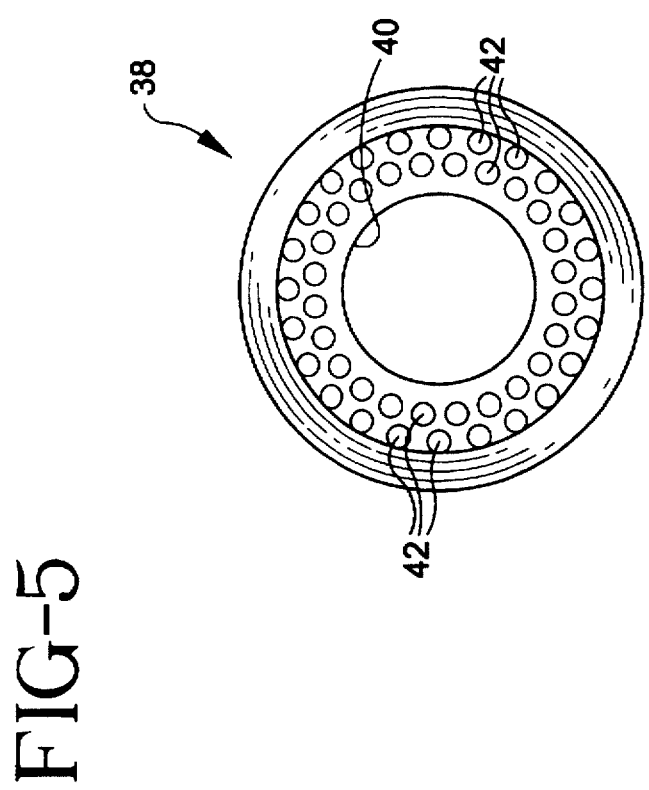
FIG. 5 is an end view of a vented cap.

The heat sink 16, 18 is comprised of two parts, a substantially cylindrical sleeve 16 and an internal, substantially cylindrical member 18 having radially extending fins 22. FIGS. 4A and 4B show the internal member 18. The heat sink may alternatively be of integral construction.

The blow pin body includes an axial bore 24 having substantially the same diameter as the outer diameter of the blow rod. An internal cavity 26 having a diameter which is substantially larger than the axial bore is defined by a relatively thin outer wall 28 at one end of the body. The wall 28 also defines an external cavity opening. The heat sink 16, 18 is positioned within the cavity, and engages the outer wall 28 to facilitate the transfer of heat therefrom by means of conduction. The cutting edge 20 is located near the inner ends of the cavity and heat sink. It accordingly is cooled substantially as heat is effectively transferred therefrom.

The outer wall 28 is substantially thinner than comparable outer walls found in prior art blow pins. By reducing the mass of tool steel in the blow pin body and replacing it with a material having superior heat transfer properties, the blow pin assembly can be maintained at a much lower temperature during blow molding operations. In the preferred embodiment of the invention, the thickness of the outer wall varies from about 0.082 to about 0.055 inches. In comparison, the wall thickness of conventional blow pins of this type ranges from about 0.152 inches to about 0.125 inches. The maximum thickness of the outer wall of the blow pin according to the invention is preferably about 0.1 inch.

The sleeve 16 is preferably made of aluminum. It is press fit into the cavity 26, and fully engages the outer wall 28 of the blow pin body. Heat is transferred from the outer wall 28 and adjoining portions of the blow pin body via conduction.

The finned member 18 is also preferably made from aluminum. The fins 22 and inner surface of the sleeve define a plurality of axially extending flow passages 30. As the fins engage the inner surface of the sleeve 16, heat is transferred from the sleeve to the finned members via conduction. The flow passages provide convective heat transfer from both the sleeve and the finned member 18, as discussed below.

The finned member includes a substantially cylindrical axial passage 32, as best shown in FIGS. 4A and 4B. The portions of the axial passage near each end thereof are substantially the same in diameter. The center portion of this passage is larger in diameter. An annular chamber or space 34 is accordingly formed between the outer surface of the blow rod and inner surface of the finned member 18, as shown in FIG. 2.

A plurality of radially extending flow passages 36 are provided within the finned member. These flow passages 36 communicate the axially extending flow passages 30 with the annular space 34. They further enhance the ability of the heat sink to draw heat from the blow pin body and, most importantly, the cutting edge 20, towards the blow rod.

A vented cap 38 adjoins one end of the heat sink 16, 18. The cap includes an axial passage 40 for accommodating the blow rod and two sets of openings 42. The sets of openings define an inner circle and an outer circle, respectively. The cap functions as an air passageway, allowing air to enter the flow passages of the heat sink. It also maintains the blow pin assembly in a selected position, either aligned with the axis of the blow rod or slightly misaligned. A lock nut 44 may be secured to a threaded position of the blow rod in adjoining relation to the cap.

The lower end of the blow rod 12 includes a plurality of holes 46, each of which is oriented upwardly at an oblique angle with respect to the longitudinal axis of the blow rod. Air exiting these holes both inflates the parison and travels through the openings in the vented cap into the heat sink. The flow passages 30, 36 and annular space 34 provide sufficient air circulation within the heat sink that heat is effectively dissipated. This allows heat from the cutting edge 20 to be rapidly transferred to the heat sink as a temperature differential between the blow pin body and heat sink is maintained.

As discussed above, the invention takes advantage of the fact that only certain portions of a blow pin must be made from a durable material such as tool steel. While the blow pin described above is of integral construction, it may alternatively be comprised of separable components. U.S. Pat. No. 5,256,055, the disclosure of which is incorporated herein by reference, describes a blow pin including a pair of air seals, one of which includes a recess for receiving a shear ring, and an air diverter. Such an assembly may be adapted such that one or more the components thereof function as a heat sink for drawing heat from the shear ring. In such an assembly, the blow pin "body" would be the shear ring itself, while the heat sink would be comprised of one or more of the other components of the blow pin assembly. In order to draw a sufficient amount of heat away from the shear ring, the components comprising the heat sink must engage a sufficient surface area of the shear ring. In addition, these components must be made of aluminum or other comparable material capable of high heat transfer. Finally, the heat sink components should include a sufficient amount of exposed surface area such that heat can be transferred from the components to air emanating from the blow rod. The surface area of the heat sink components can be expanded through the use of fins and/or flow passages.

The principles of the invention can be applied to blow pins having a variety of configurations for producing container necks of various sizes and shapes. The constructions of blow pin assemblies in accordance with the invention can accordingly be tailored to individual blow molding machines and the containers to be produced in such machines.

What is claimed is:

1. An assembly for inflating a parison and forming the neck portion of a plastic container in a blow molding apparatus, comprising:

a blow rod including an axial passage, a first opening, and a second opening axially spaced from said first opening, each of said openings communicating said axial passage with the exterior of said blow rod;

a blow pin assembly mounted to said blow rod, said blow pin assembly including:

a blow pin body including a shearing member, said blow pin body being comprised of a first durable material, and a heat sink positioned for receiving heat via conduction from said blow pin body, including said shearing member, said heat sink engaging said blow pin body and being comprised of a second material having high heat transfer properties, said heat sink including at least one surface exposable to gas emanating from said second opening of said blow rod.

2. An assembly as described in claim 1, wherein said heat sink in comprised of aluminum.

3. An assembly as described in claim 1, wherein said heat sink includes an inner surface adjoining said blow rod, an outer surface abutting said blow pin body, and a plurality of axial flow passages.

4. An assembly as described in claim 3 including a chamber formed between said heat sink and said blow rod, and a plurality of radially extending passages through said heat sink communicating said chamber with a plurality of said axial flow passages.

5. An assembly as described in claim 1, wherein said blow pin body includes a wall defining an internal cavity, said wall having a maximum thickness of less than about 0.1 inches, said heat sink being positioned at least partially within said internal cavity.

6. An assembly as described in claim 5, wherein said heat sink includes a sleeve adjoining said wall of said blow pin body and a plurality of flow passages internally of said sleeve.

7. A blow pin assembly comprising:

a blow pin body including an outer surface defining an annular shearing member, said blow pin body being comprised of a first, durable material;

a heat sink comprised of a second material having high heat transfer properties, said blow pin body being mounted to said heat sink such that heat from said shearing member is transferred to said heat sink via conduction, said heat sink including one or more exposed surfaces for dissipating heat, and an axial bore extending through said blow pin body for receiving a blow rod.

8. A blow pin assembly as described in claim 7, wherein said blow pin body is comprised of tool steel and said heat sink is comprised of aluminum.

9. A blow pin assembly as described in claim 7, wherein said heat sink includes an axial passage for accommodating a blow rod, a plurality of axially extending flow passages, and a plurality of radially extending flow passages communicating said axial passage and said axially extending flow passages.

10. A blow pin assembly as described in claim 7, wherein said blow pin body includes an outer wall defining an internal cavity and a cavity opening, said heat sink being positioned within said cavity and including an external surface adjoining said outer wall and an internal surface defining an axial passage communicating with said axial bore of said blow pin body, said heat sink including a plurality of flow passages.

11. A blow pin assembly as described in claim 10, wherein said outer wall has a maximum thickness of less than about 0.1 inches.

12. A blow pin assembly as described in claim 10, wherein said heat sink includes a substantially cylindrical outer wall adjoining said outer wall of said blow pin body.

13. A blow pin assembly as described in claim 9 including a cap adjoining said heat sink, said cap including a vent communicating with a plurality of said axially extending flow passages.

14. A blow pin assembly as described in claim 8 including a plurality of flow passages within said heat sink.

15. A blow pin assembly as described in claim 14, wherein said heat sink includes an internal surface defining a substantially cylindrical axial passage, said axial passage including a section having an enlarged diameter, one or more of said flow passages intersecting said enlarged diameter section of said axial passage.

16. A blow pin assembly for forming the neck portion of a plastic container in a blow molding apparatus, comprising:

a blow pin body including an axial bore extending therethrough, and an outer surface defining a shearing member;

a heat sink capable of readily transferring heat positioned within said axial bore and engaging said blow pin body, said heat sink including a sleeve and a body portion having an outer surface adjoining an inner surface of said sleeve and an inner surface defining an inner, axial passage, a plurality of axially extending passages adjoining said inner surface of said sleeve, and a radially extending passage through said body portion communicating at least one of said axially extending passages with said inner, axial passage.

17. A blow pin assembly as described in claim 16, wherein said blow pin body includes an outer wall extending from said shearing member, said outer wall having a maximum thickness of less than about 0.1 inches.

18. A blow pin assembly a described in claim 16, wherein said inner axial passage of said heat sink includes an enlarged portion, said radially extending passage intersecting said inner axial passage at said enlarged portion.

19. A blow pin assembly as described in claim 16, wherein said heat sink includes a plurality of radially extending passages extending through said body portion thereof, said radially extending passages extending between said axially extending passages and said inner, axial passage.

20. A blow pin assembly as described in claim 19, wherein said radially extending passages intersect said inner, axial passage at a plurality of axially spaced locations.

* * * * *